(No Model.)
W. H. THOMAS.
SEED SOWER.
No. 300,659. Patented June 17, 1884.
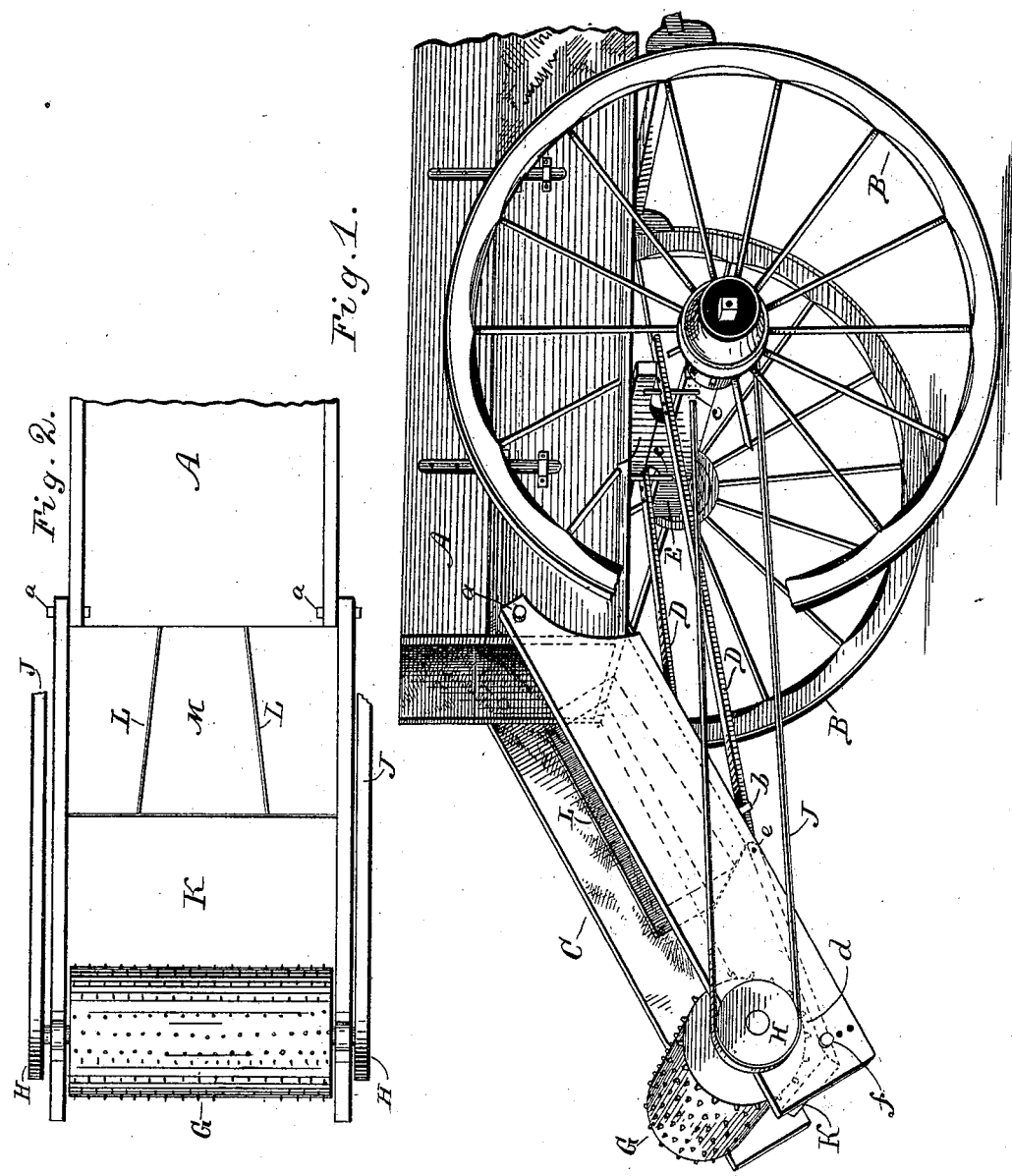
WITNESSES:
Thos. Houghton.
W. X. Stevens.
INVENTOR:
Wm. H. Thomas
BY Munn & Co.
ATTORNEYS.

UNITED STATES PATENT OFFICE.

WILLIAM HENRY THOMAS, OF FULTON, MISSOURI.

SEED-SOWER.

SPECIFICATION forming part of Letters Patent No. 300,659, dated June 17, 1884.

Application filed February 27, 1884. (No model.)

*To all whom it may concern:*

Be it known that I, WILLIAM HENRY THOMAS, a citizen of the United States, residing at Fulton, in the county Callaway and State of Missouri, have invented certain new and useful Improvements in Seed-Sowers, of which the following is a description.

This invention relates to that class of seed-sowers which are drawn over the field upon wheels, and which are adapted to sow seed unseparated from the chaff.

The object of the invention is to sow seed from the rear end of a wagon by the assistance of a person riding in the wagon.

To this end my invention consists in the construction and combination of parts forming a seed-sowing attachment for wagons hereinafter described and claimed, reference being had to the accompanying drawings, in which—

Figure 1 is a perspective view of a wagon showing my seed-sower attached, a portion being broken away to show the joint in the bottom. Fig. 2 is a plan view of the same.

A represents a farm-wagon having the usual wheels, B, and removable hind board, which is taken out when the seeder is in use, and is not now shown.

C represents the body of my seeder, hung upon pivots $a$ to the wagon, and braced by means of two braces, D, entering at their lower ends beneath staples $b$, and at their upper ends passing between the axle E and sand-board F of the wagon. These braces are provided with a number of pin-holes each, and a pin, $c$, to rest against the axle while placed in any one of said holes, whereby the body C of the seeder may be set to ride at any required distance from the ground. The body C consists of a bottom and two sides, which make it a sort of spout for the wagon to be emptied through by a person in the wagon pushing or shoveling its contents gradually out at the rear end into the seeder. To insure an equal distribution of the seed or other material so shoveled out I provide a toothed roller, G, which is journaled in the lower end of the seeder, and is revolved by pulleys H on the ends of its shaft, and belts J, running thereto from the hubs of the wheels B as pulleys. By this means there can be only a given amount of seed fed between the roller G and the bottom board, K, no matter how high the seed may be piled in front of the roller.

To regulate the quantity of seed sown at each revolution of the roller, I make the throat $d$ between the roller and the bottom adjustable by hinging one half, K, of the bottom at $e$ to the sides of the seeder-body, so that its lower end may be set to or from the roller G, and by providing screw-holes in the sides and a screw, $f$, to enter through one of them into the bottom, to fix the latter at the height desired.

To prevent the seed from being jolted to one side of the feeder I provide two partitions, L, which are secured to the stationary bottom board, M. These partitions also enable the operator to see quickly when any part of the feed-roll requires more seed.

While the main use of this machine is to sow seed in the chaff, yet it may be used for spreading manure. This seeder may be made as wide as the aligning of the pulleys H with the hubs of wheels B will allow.

What I claim as my invention, and desire to secure by Letters Patent, is—

A seed-sower comprising a trough-shaped body, C, the upper rear corners of whose sides, extending farther back than its floor, are provided with pins $a$, and a portion of its bottom K pivoted at $e$, in combination with a pin, $f$, and holes in the side boards, a toothed roller, G, journaled in the sides, pulleys H on the shaft of said roller, belts J, adapted to run on the said pulleys and on the hubs of a common wagon, and braces D, having pin-holes and pins $c$, substantially as shown and described, whereby the seeder may be hung at the points $a$ to a common wagon, and be adjustably supported by the braces D, and be operated by the turning of the wagon-wheels in traveling.

WILLIAM HENRY THOMAS.

Witnesses:
SAM. BARRY COLLIER,
JOHN H. HOWARD.